(12) United States Patent
Jiang et al.

(10) Patent No.: US 10,783,401 B1
(45) Date of Patent: Sep. 22, 2020

(54) BLACK-BOX ADVERSARIAL ATTACKS ON VIDEOS

(71) Applicant: Fudan University, Shanghai (CN)

(72) Inventors: Yugang Jiang, Shanghai (CN); Linxi Jiang, Shanghai (CN); Xingjun Ma, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 16/798,393

(22) Filed: Feb. 23, 2020

(51) Int. Cl.
| | | |
|---|---|---|
| *G06K 9/62* | (2006.01) | |
| *G06N 20/00* | (2019.01) | |
| *G06F 16/73* | (2019.01) | |
| *G06N 7/00* | (2006.01) | |
| *G06K 9/00* | (2006.01) | |
| *G06F 21/57* | (2013.01) | |

(52) U.S. Cl.
CPC .......... *G06K 9/6257* (2013.01); *G06F 16/73* (2019.01); *G06F 21/577* (2013.01); *G06K 9/00765* (2013.01); *G06K 9/628* (2013.01); *G06K 9/6262* (2013.01); *G06N 7/005* (2013.01); *G06N 20/00* (2019.01); *G06F 2221/034* (2013.01)

(58) Field of Classification Search
CPC ............ G06K 9/6257; G06K 9/00765; G06K 9/6262; G06K 9/628; G06N 20/00; G06N 7/005; G06F 16/73; G06F 21/577; G06F 2221/034
See application file for complete search history.

(56) References Cited

U.S. PATENT DOCUMENTS

| | | | | |
|---|---|---|---|---|
| 8,238,444 B2* | 8/2012 | Huang | ................. | H04N 19/154 375/240.02 |
| 8,331,451 B2* | 12/2012 | Bang | ...................... | H04N 19/51 375/240.16 |
| 8,605,975 B2* | 12/2013 | Pan | ........................ | G06T 11/006 382/130 |
| 8,923,587 B2* | 12/2014 | Pan | ........................ | G06T 11/006 382/130 |

(Continued)

OTHER PUBLICATIONS

Wang et al., "Adversarial attacks on Faster R-CNN object detector", (pp. 87-95) (Year: 2019).*

(Continued)

*Primary Examiner* — Manav Seth
(74) *Attorney, Agent, or Firm* — Brad Bertoglio; Intelink Law Group, P.C.

(57) ABSTRACT

A method for generating black-box adversarial attacks on video recognition models is provided, comprising a) passing input video frames into a public image model, to obtain pixel-wise tentative perturbations; b) partitioning the tentative perturbations into tentative perturbation patches; c) estimating the rectification weight required for each patch, via querying the target video model; d) applying the patch-wise rectification weight on the patches, to obtain the rectified pixel-wise perturbations; e) applying one step projected gradient descent (PGD) perturbation on the input video, according to the rectified pixel-wise perturbations; and f) iteratively performing steps a)-e) until an attack succeeds or a query limit is reached. Systems and networks therefor are also provided.

19 Claims, 4 Drawing Sheets
(4 of 4 Drawing Sheet(s) Filed in Color)

(56) References Cited

U.S. PATENT DOCUMENTS

| | | | | |
|---|---|---|---|---|
| 9,031,331 | B2* | 5/2015 | Mensink | G06K 9/6272 |
| | | | | 382/159 |
| 9,251,606 | B2* | 2/2016 | Liang | G06T 11/006 |
| 9,613,442 | B2* | 4/2017 | Pan | G06T 11/006 |
| 9,848,844 | B2* | 12/2017 | Simon | G06T 11/006 |
| 9,915,730 | B2* | 3/2018 | Mansour | G01S 13/89 |
| 10,304,191 | B1* | 5/2019 | Mousavian | G06T 7/70 |
| 10,339,706 | B2* | 7/2019 | Black | G06K 9/00369 |
| 2011/0142124 | A1* | 6/2011 | Huang | H04N 19/61 |
| | | | | 375/240.02 |
| 2015/0130953 | A1* | 5/2015 | Mansour | G06T 7/20 |
| | | | | 348/208.1 |
| 2015/0309136 | A1* | 10/2015 | Shu | G01R 33/5611 |
| | | | | 324/309 |
| 2016/0078359 | A1* | 3/2016 | Csurka | G06K 9/6262 |
| | | | | 706/12 |
| 2018/0014005 | A1* | 1/2018 | Bronstein | H04N 13/243 |
| 2018/0018757 | A1* | 1/2018 | Suzuki | A61B 6/03 |
| 2019/0220605 | A1* | 7/2019 | Kounavis | G06F 21/60 |
| 2019/0244103 | A1* | 8/2019 | Wang | G06N 3/0454 |
| 2019/0348075 | A1* | 11/2019 | Derbanne | H04N 5/23267 |
| 2020/0027252 | A1* | 1/2020 | Ye | G01N 23/10 |
| 2020/0082264 | A1* | 3/2020 | Guo | G06N 3/04 |
| 2020/0134468 | A1* | 4/2020 | Ding | G06K 9/6256 |

OTHER PUBLICATIONS

Wu et al., "Efficient Project Gradient Descent for Ensemble Adversarial Attack", (pp. 1-6) (Year: 2019).*

* cited by examiner

BLACK-BOX ADVERSARIAL ATTACKS ON VIDEOS

TECHNICAL FIELD

This invention is related to a method for generating black-box adversarial attacks on videos, in particularly, on video recognition models. This invention is also related to a system and a network thereof.

BACKGROUND

Deep Neural Networks (DNNs) are a family of powerful models that have demonstrated superior performance in a wide range of visual understanding tasks that has been extensively studied in both the multimedia and computer vision communities such as video recognition, image classification and video captioning.

Despite their current success, DNNs have been found to be extremely vulnerable to adversarial examples (or attacks). For classification DNNs, adversarial examples can be easily generated by applying adversarial perturbations to clean (normal) samples, which maximize the classification error. For images, the perturbations are often small and visually imperceptible to human observers, but they can fool DNNs into making misclassifications with high confidence. The vulnerability of DNNs to adversarial examples has raised serious security concerns for their deployment in security-critical applications, such as face recognition and self-driving cars. Hence, the study of adversarial examples for DNNs has become a crucial task for secure deep learning.

Adversarial examples can be generated by an attack method (also called an adversary) following either a white-box setting (white-box attacks) or a black-box setting (black-box attacks). In the white-box setting, an adversary has full access to the target model (the model to attack), including model training settings and parameters. In the black-box setting, an adversary only has partial information about the target model, such as the labels or probabilities output by the model.

White-box methods generate an adversarial example by applying one step or multiple steps of perturbations on a clean test sample, following the direction of the adversarial gradient. The adversarial gradient is the gradient of an adversarial loss, which is typically defined to maximize (rather than minimize) classification error. However, in the black-box setting, adversarial gradients are not accessible to an adversary. In this case, the adversary can first attack a local surrogate model and then transfer these attacks to the target model. Alternatively, they may use a black-box optimization method such as Finite Differences (FD) or Natural Evolution Strategies (NES), to estimate the gradient.

A number of attack methods have been proposed, however, most of them focus on either image models, or video models but in a white-box setting.

The fast gradient sign method (FGSM) crafts an adversarial example by perturbing a normal sample along the gradient direction towards maximizing the classification error ("Explaining and harnessing adversarial examples", see supra.). FGSM is a fast one-step attack, and can be applied iteratively to improve adversarial strength. Projected Gradient Descent (PGD) is another iterative method that is regarded as the strongest first-order attack ("Towards deep learning models resistant to adversarial attacks", Madry et al., 2018, ICLR). PGD projects the perturbation back onto the $\varepsilon$-ball of a sample x when perturbation goes beyond the $\varepsilon$-ball. The C&W attack solves the attack problem via an optimization framework ("Towards evaluating the robustness of neural networks", see supra.), and is arguably the state-of-the-art white-box attack. There also exists other types of white-box methods, e.g., Jacobian-based Saliency Map Attack (JSMA) ("The limitations of deep learning in adversarial settings", Papernot et al., EuroS&P, 2016), DeepFool ("Deepfool: a simple and accurate method to fool deep neural networks", Moosavi-Dezfooli et al., CVPR, 2016) and elastic-net attack (EAD) ("Ead: elastic-net attacks to deep neural networks via adversarial examples", Chen et al., AAAI, 2018).

In contrast to image adversarial examples, much less work has been done for video adversarial examples. White-box video attacks were first investigated in "Sparse adversarial perturbations for videos" (Wei et al., arXiv preprint arXiv:1803.02536, 2018), which discussed the sparsity and propagation of adversarial perturbations across video frames. In "Adversarial perturbations against real-time video classification systems" (Neupane et al., arXiv preprint arXiv:1807.00458, 2018), it leverages Generative Adversarial Networks (GANs) to perturb each frame in real-time video classification.

Significant progress has been also achieved for black-box image attacks, but not for black-box video attacks. A key reason is that videos typically have much higher dimensionality (often two magnitudes higher) than static images. On static images, for most attacks to succeed, existing black-box methods must use ~$10^{-4}$ queries on CIFAR-10 ("Learning multiple layers of features from tiny images", Krizhevsky et al., Citeseer, Tech. Rep., 2009) images, and ~$10^{-5}$ queries on ImageNet ("Imagenet: A large-scale hierarchical image database", Deng et al., CVPR, 2009) images. Due to their massive input dimensions, black-box attacks on videos generally require two orders of magnitude more queries for gradient estimation than that required for images. This makes black-box video attacks impractical, taking into account time and budget constraints. To better evaluate the robustness of video models, it is therefore important to explore efficient black-box methods that can generate attacks using fewer queries.

In the black-box setting, an adversarial gradient is not directly accessible by an adversary. As such, black-box image attacks either exploit the transferability of adversarial examples or make use of gradient estimation techniques. It was first observed in "Intriguing properties of neural networks" (Szegedy et al., ICLR, 2014) that adversarial examples are transferable across models, even if they have different architectures or were trained separately. In "Practical black-box attacks against machine learning" (Papernot et al., ASIACCS, 2017), it trains a surrogate model locally on synthesized data, with labels obtained by querying the target model. It then generates adversarial examples from the surrogate model using white-box methods to attack the target model. However, training a surrogate model on synthesized data often incurs a huge number of queries, and the transferability of generated adversarial examples is often limited. In "Zoo: Zeroth order optimization based black-box attacks to deep neural networks without training substitute models" (Chen et al., AISec, 2017), it is proposed to use Finite Differences (FD), a black-box gradient estimation method, to estimate the adversarial gradient. In "Practical black-box attacks on deep neural networks using efficient query mechanisms" (Bhagoji et al., ECCV, 2018), it accelerates FD-based gradient estimation with dimensionality reduction techniques such as PCA. Compared to FD, in "Black-box adversarial attacks with limited queries and information" (Ilyas et al., ICML, 2018) it demonstrates improved performance with fewer queries by the use of Natural Evolutionary Strategies (NES).

There is a need to provide a new and improved mechanism for generating black-box adversary attacks on video recognition models.

SUMMARY

In one aspect of this application, it is provided a method for providing black-box video attacks on video recognition models, comprising:

a) passing input video frames into a public image model, to obtain pixel-wise tentative perturbations;

b) partitioning the tentative perturbations into tentative perturbation patches;

c) estimating the rectification weight required for each patch, via querying the target video model;

d) applying the patch-wise rectification weight on the patches, to obtain the rectified pixel-wise perturbations;

e) applying one step projected gradient descent (PGD) perturbation on the input video, according to the rectified pixel-wise perturbations; and f) iteratively performing steps a)-e) until an attack succeeds or a query limit is reached.

Preferably, the public image model is an ImageNet pre-trained model.

Preferably, the tentative perturbation is defined as the sign values (1, 0, or −1) of the perturbation.

Preferably, the tentative perturbation is a random perturbation, wherein the perturbation for each input dimension is generated randomly with 50% probability of being either 1 or −1.

Preferably, the tentative perturbation is a static perturbation, wherein the perturbation for each input dimension is fixed to 1.

Preferably, the tentative perturbation is a transferred perturbation, wherein the perturbation can alternatively be transferred from existing pre-trained image models.

Preferably, each tentative perturbation patch is adjusted by multiplying all its dimensions by a rectification factor found by a gradient estimator Preferably, the gradient estimator is FD or NES.

Preferably, the partitioning step includes dividing input dimensions randomly into a certain number of partitions.

Preferably, the partitioning step includes splitting a frame uniformly into some patches.

Preferably, the partitioning step includes partitioning the video input according to its semantic content.

Preferably, a successful attack comprises the situation that an untargeted adversarial example has been found or a targeted adversarial example.

Preferably, the query limit is preset.

Preferably, the untargeted adversarial example is an example that can be misclassified in an arbitrary class other than the correct one.

Preferably, the targeted adversarial example is an example that can be misclassified in a targeted adversarial class.

In another aspect of this application, it is provided a system for providing black-box video attacks on a video recognition model, comprising:

a) a perturbation creator for creating pixel-wise tentative perturbations by passing input video frames into a public image model;

b) a partitioner for dividing the tentative perturbations into tentative perturbation patches;

c) a black-box gradient estimator for estimating the rectification weight required for each patch, via querying the target video model;

d) a patch-based rectifier for applying the patch-wise rectification weight on the patches, to obtain the rectified pixel-wise perturbations;

e) a frame modifier for applying one step projected gradient descent (PGD) perturbation on the input video, according to the rectified pixel-wise perturbations;

f) a counter for counting query numbers; and g) a receiver for receiving the recognition result from the video recognition model;

wherein the perturbation creator, the partitioner, the black-box gradient estimator, the patch-based rectifier and the frame modifier work iteratively, until the query numbers reach a query limit in the counter, or a result including an untargeted adversarial example or a target adversarial example is received by the receiver.

In yet another aspect of this application, it is provided a network for providing black-box video attacks on a video recognition model, comprising:

a) a perturbation creation module for creating pixel-wise tentative perturbations by passing input video frames into a public image model;

b) a partitioning module for dividing the tentative perturbations into tentative perturbation patches;

c) a black-box gradient estimation module for estimating the rectification weight required for each patch, via querying the target video model;

d) a patch-based rectification module for applying the patch-wise rectification weight on the patches, to obtain the rectified pixel-wise perturbations;

e) a frame modification module for applying one step projected gradient descent (PGD) perturbation on the input video, according to the rectified pixel-wise perturbations;

f) a counting module for counting query numbers; and g) an receiving module for receiving the recognition result from the video recognition model;

wherein the perturbation creation module, the partitioning module, the black-box gradient estimation module, the patch-based rectification module and the frame modification module work iteratively, until the query numbers reach a query limit in the counting module, or a result including an untargeted adversarial example or a target adversarial example is received by the receiving module.

In this application, it is proposed a simple and efficient framework for the generation of black-box adversarial attacks on video recognition models. The proposed framework only needs to estimate a small number of directional derivatives (of perturbation partitions), rather than estimating pixel-wise derivatives, making it an efficient framework for black-box video attacks. It exploits both the transferability of adversarial gradients via the use of tentative perturbations, and the advantages of gradient estimation via NES on partitions (patches) of tentative perturbations, and it can achieve high attack success rates with few queries to target models, making it a useful tool for the robustness evaluation of video models.

BRIEF DESCRIPTION OF DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention. In addition, it is understood that any titles or sub-titles used in this application are only for illustrative, other than limitative purpose.

The patent or application file contains at least one drawing executed in color. Copies of this patent or patent application publication with color drawing(s) will be provided by the Office upon request and payment of the necessary fee.

Wherein.

DETAILED DESCRIPTION

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

A video sample is denoted by $x \in X \subset R^{\{N \times H \times W \times C\}}$ with N, H, W, C each denoting the number of frames, frame height, frame width, and the number of channels respectively, and its associated true class by $y \in Y = \{1, \ldots, K\}$. Video recognition is to learn a classification DNN $f(x;\theta): x \rightarrow y$ by minimizing the classification loss $l(f(x;\theta),y)$, and $\theta$ denotes the parameters of the network. When the context is clear, $f(x;\theta)$ is denoted as $f(x)$, and $l(f(x;\theta),y)$ as $l(x,y)$. The goal of adversarial attack is to find an adversarial example $x_{adv}$ that maximizes the classification error, while remaining in the $\varepsilon_{adv}$-ball centered at x ($\|x_{adv}-x\|_p \le \varepsilon_{adv}$). In this application, it is the $L^\infty$-norm that is only focused on, that is, $\|x_{adv}-x\|_\infty \le \varepsilon_{adv}$; anyway, the framework according to this invention also applies to other norms.

There are two types of adversarial attacks: untargeted attack and targeted attack. Untargeted attack is to find an adversarial example that can be misclassified in an arbitrary class other than the correct one (e.g. $f(x_{adv}) \ne y$), while targeted attack is to find an adversarial example that can be misclassified in a targeted adversarial class (e.g. $f(x_{adv})=y_{adv}$ and $y_{adv} \ne y$).

For simplicity, the adversarial loss function that should be optimized to find an adversarial example is denote by $l_{adv}(x)$, and let $l_{adv}(x)=-l(x,y)$ for untargeted attack and $l_{adv}(x)=l(x,y_{adv})$ for targeted attack. The adversarial gradient of the adversarial loss to the input is also denoted as $g=\nabla_x l_{adv}(x)$. Accordingly, an attacking method is to minimize the adversarial loss $l_{adv}(X)$ by iteratively perturbing the input sample following the direction of the adversarial gradient g.

Our threat model follows the query-limited black-box setting as follows. The adversary takes the video classifier f as a black-box and only has access to its output of the top 1 score. More specifically, during the attack process, given an arbitrary clean sample x, the adversary can query the target model f to obtain the top 1 label $\hat{y}$ and its probability $P(\hat{y}|x)$. The adversarial are asked to generate attacks within Q queries. Both untargeted and targeted attacks are considered. For an untargeted attack, the goal is to generate an adversarial example $x_{adv}$ such that $f(x_{adv}) \ne y$, while for a targeted attack with target class $y_{adv}$, the goal is to find an adversarial example $x_{adv}$ such that $f(x_{adv})=y_{adv}$ and $y_{adv} \ne y$.

Figure 1:
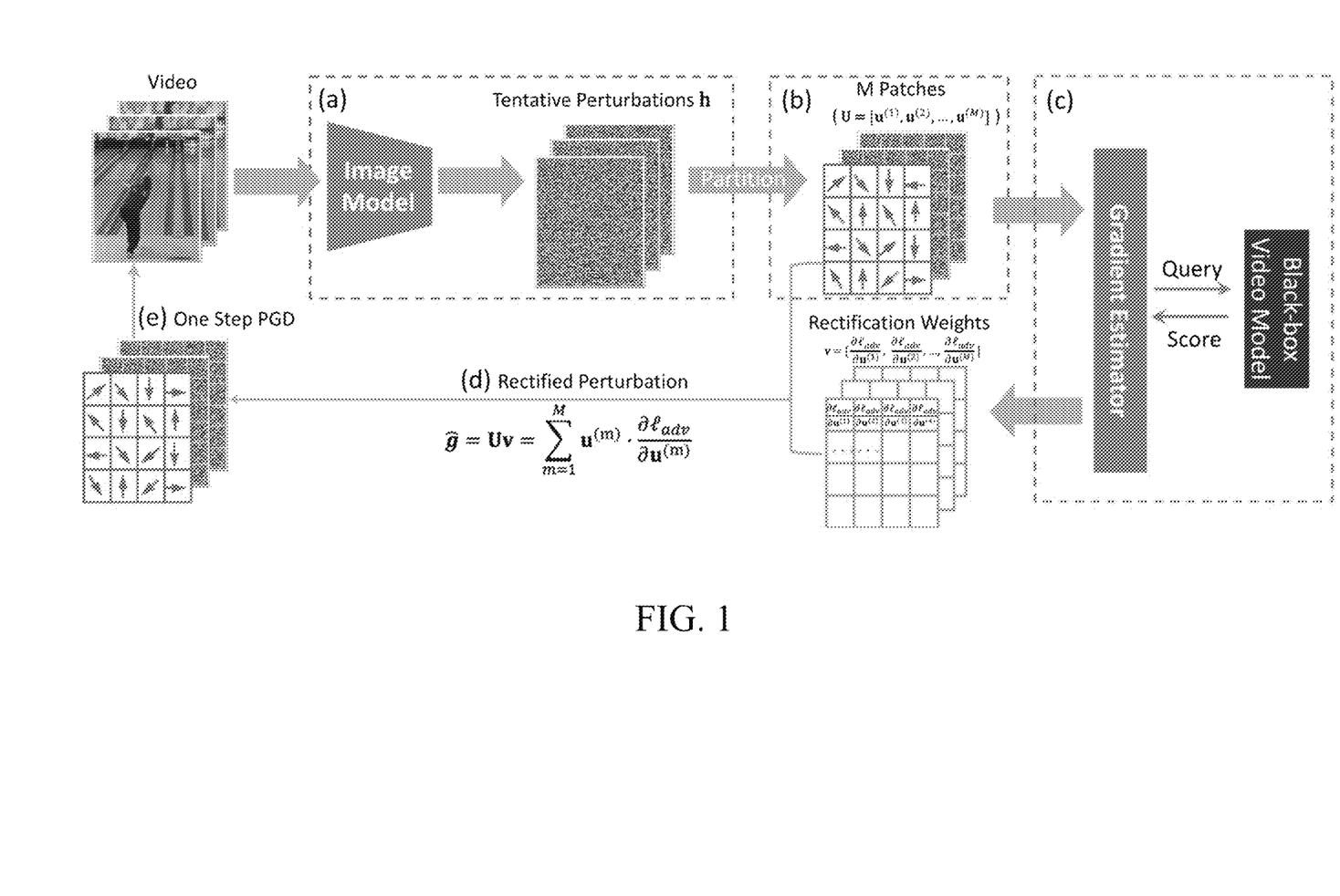
FIG. 1 is a schematic block diagram of a system for black-box video attacks, namely V-BAD, according to one embodiment of this invention.

FIG. 1 shows an overview structure of the system for black-box video attacks, namely V-BAD, according to one embodiment of this invention. Following steps (a)-(e) highlighted in FIG. 1, V-BAD perturbs an input video iteratively, using PGD as follows:

a) It first passes video frames into a public image model (e.g. pretrained ImageNet), to obtain pixel-wise tentative perturbations h;

b) It then applies a partition operation to split up tentative perturbations h into patches, in) particularly, a set of M patches $U=[u^{(1)}, u^{(2)}, \ldots, u^{(M)}]$, where $u^{(m)}$ represents the m-th patch;

c) A black-box gradient estimator estimates the rectification weight $$v_m = \frac{\partial l_{adv}}{\partial u^{(m)}}$$

required for each patch, via querying the target video model;

d) Apply the patch-wise rectification weight on the patches, to obtain the rectified pixel-wise perturbations $\hat{g}$;

e) Apply one step PGD perturbation on the input video, according to the rectified pixel-wise perturbations $\hat{g}$.

This process iterates until an attack succeeds, i.e., an untargeted/targeted adversarial example has been found, or the query limit is reached. Steps a)-d) are for gradient estimation, while step e) is for perturbing the input video.

Specifically, the proposed method at the t-th PGD perturbation step can be described as:

$$v=0 \qquad (1)$$

$$h^t = \phi(x^{t-1}) \qquad (2)$$

$$U=G(h^t) \qquad (3)$$

$$\hat{v} + v + \nabla J_{adv}(x^{t-1}+R(\hat{v},U)) \qquad (4)$$

$$\hat{g}=R(\hat{v},U) \qquad (5)$$

$$x^t = \Pi_\varepsilon(x^{t-1} - \alpha \cdot \text{sign}(\hat{g})) \qquad (6)$$

where, $x^{t-1}$ is the adversarial example generated at step t-1, $\phi(\cdot)$ is the function to extract tentative perturbations, $G(\cdot)$ is a partitioning method that splits pixels of $h^t$ into a set of patches U, $\hat{v}$ is the estimated rectification weights for patches in U via a black-box gradient estimator, $R(v, U)$ is a rectification function that applies patch-wise rectifications $\hat{v}$ to patches in U to obtain pixel-wise rectified perturbations $\hat{g}$, $\Gamma(\cdot)$ is a projection operation, $\text{sign}(\cdot)$ is the sign function, $\alpha$ is the PGD step size, $\varepsilon$ is the perturbation constraint. R(v, U) applies the rectification weights to patches, thus enables us to estimate the gradients with respect to the patches in place of the gradients with respect to the raw pixels, which reduces the dimension of attack space from $R^{N \times H \times W \times C}$ to $R^M$ where M is the number of patches. Each of the above operations will be explained below in details.

For a targeted attack, it is to ensure the target class is in the top-1 classes, as the score of the target class is required for gradient estimation. Thus, instead of the original video sample x, it is to begin with a sample from the target class (e.g. $x^0=x'$ and $f(x')=y_{adv}$), then gradually (step by step) reduce the perturbation constraint ε from 1 (for normalized inputs $x \in [0, 1]$) to $\varepsilon_{adv}$ while maintaining the targeted class as the top-1 class. Please note that although it is started with $x^0=x'$, the adversarial example will eventually be moved into the $\varepsilon_{adv}$-ball centered at the original example x.

The targeted V-BAD attack is described in Algorithm 1 (see infra). An epsilon decay Δε is used to control the reduction size of the perturbation bound. The epsilon decay Δε and PGD step size α are dynamically adjusted and the details are omitted for simplicity.

---

Algorithm 1 Targeted V-BAD attack

---

Input: Top-1 probability $P(\hat{y}|x)$ with respect to classifier f, target class $y_{adv}$ and video x
Output: Adversarial video $x_{adv}$ with $\|x_{adv} - x\|_\infty \leq \varepsilon_{adv}$
Parameters: Perturbation bound $\varepsilon_{adv}$, epsilon decay Δε, PGD step size α
  ε ← 1, $x_{adv}$ ← video of target class $y_{adv}$
  while ε > $\varepsilon_{adv}$ do
    ĝ ← Gradient estimation following Eq. (1)-(5)
    ε ← ε − Δε
    $\hat{x}_{adv}$ ← CLIP($x_{adv} - \alpha \cdot \hat{g}$, x − ε̂, x + ε̂)
    if $y_{adv}$ = TOP-1(P(•|$\hat{x}_{adv}$)) then
      $x_{adv}$ ← $\hat{x}_{adv}$, ε̂ ← ε
    else
      $\hat{x}_{adv}$ ← CLIP($x_{adv} - \alpha \cdot \hat{g}$, x − ε, x + ε)
      if $y_{adv}$ = TOP-1(P(•|$\hat{x}_{adv}$)) then
        $x_{adv}$ ← $\hat{x}_{adv}$
      end if
    end if
  end while
  return $x_{adv}$

---

For untargeted attack, it is to use the original clean example $x^0=x$ as the starting point: where x is the original clean example. And the perturbation bound ε is set to the constant $\varepsilon_{adv}$ throughout the attacking process. Given estimated adversarial gradient ĝ, untargeted attack follows the standard procedure of PGD attack, therefore the algorithm is omitted here.

Tentative perturbation refers to initialized pixel-wise adversarial perturbation, generated at the beginning of each perturbation step, via function φ(•) in Eq. (2). As PGD only needs the sign of adversarial gradient to perturb a sample, here the sign values is also taken for tentative perturbations.

Three types of tentative perturbation are discussed in this application.

1) Random: the perturbation at each input dimension takes value 1 or −1 equiprobably. Random perturbations only provide a stochastic exploration of the input space, which can be extremely inefficient due to the massive input dimensions of videos.

2) Static: the perturbation for each input dimension is fixed to 1. Fixed perturbations impose a strong constraint on the exploration space, with the same tentative perturbations used for each gradient estimation.

3) Transferred: tentative perturbations can alternatively be transferred from off-the-shelf pre-trained image models.

Since natural images share certain similar patterns, image adversarial examples often transfer across models or domains, though the transferability can be limited and will vary depending on the content of the images. To better exploit such transferability for videos, a pre-trained image model such as an ImageNet pre-trained DNN is proposed to white-box attack, in order to extract the tentative perturbation for each frame. The resulting transferred perturbation can provide useful guidance for the exploration space and help reduce the number of queries.

The tentative perturbations for an intermediate perturbed sample $x^{t-1}$ can be extracted by:

$$\phi(x^{t-1}) = \text{sign}\left(\nabla_{x^{t-1}} \frac{1}{N} \sum_{n=1}^{N} \left\| b_n \circ \tilde{f}_l(x_n^{t-1}) - b_n \circ r_n \right\|_2^2 \right), \quad (7)$$

where sign(•) is the sign function, ∘ is the element-wise product, $\|\cdot\|_2^2$ is the squared $L^2$-norm, N is the total number of frames, $\tilde{f}_l(\cdot)$ is the l-th layer (e.g. feature layer) of a public image model $\tilde{f}$, $b_n$ is a random mask on the n-th frame, $r_n$ is a target feature map which has the same dimension as $\tilde{f}_l(x_n^{t-1})$. Φ(•) is to generate tentative perturbations by minimizing the $L_2$ distance between the feature map AO and a target (or adversarial) feature map $r_n$.

For untargeted attack, $r_n$ is a feature map of Gaussian random noise, while for targeted attack, $r_n$ is the feature map $\tilde{f}_l(x_n')$ of the n-th frame of a video x' from the target class $y_{adv}$. The random mask $b_n$ is a pixel-wise mask with each element is randomly set to either 1 or 0. The use of random mask can help avoid getting stuck in situations where the frame-wise tentative perturbations are extremely inaccurate to allow any effective rectification.

Tentative perturbations are transferred rough estimate of the true adversarial gradient. Thus, it should be further rectified to better approximate the true adversarial gradient. To achieve this more efficiently, in this application, it is proposed to perform rectifications at the patch-level (in contrast to pixel-level) and use gradient estimation methods to estimate the proper rectification weight for each patch.

That is, firstly to partition a tentative perturbation into separate parts, which is called perturbation patches, and then estimate the patch-level rectifications for these partition patches. Here the partitioning methods, rectification function, and rectification weights estimation will be successively introduced.

In this application two types of partitioning strategies are considered.

1) Random: dividing input dimensions randomly into a certain number of partitions. Note that the input dimensions of one random partition patch can be nonadjacent, although it is referred to as a patch. Random does not consider the local correlations between input dimensions but can be used as a baseline to assess the effectiveness of carefully designed partitioning methods.

2) Uniform: splitting a frame uniformly into some patches. This will produce frame patches that preserve local dimensional correlations.

Each patch constitutes a vector with the same number of dimensions as the input by zero padding: assigning zero values to dimensions that do not belong to the patch, while keeping its values at dimensions that belong to the patch. That is, for the m-th patch, we have a vector $u^{(m)}$:

$$u_j^{(m)} = \begin{cases} h_j & \text{if dimension } j \text{ is in the } m\text{-th patch} \\ 0 & \text{otherwise} \end{cases}.$$

Note that, $u^{(m)}$ has equal number of dimensions to both x and h, namely, $u^m \in \mathbb{R}^{N \times H \times W \times C}$. The $u^{(m)}$ is normalized to unit vector $$u^{(m)} = \frac{u^{(m)}}{|u^{(m)}|}$$

(|•| is the vector norm), which is called the direction vector of the m-th patch. The partition function can be written as:

$$G(h) = [u^{(1)}, u^{(2)}, \ldots, u^{(M)}]$$

The output of partition function is denoted as U=G(h).

The rectification function R(v, U) (in Eq. (4) and (5)) can be expressed as applying the components of rectification vector v as weights to each patch. Given a patch-wise rectification vector v (estimated by some black-box gradient estimator), rectification is to apply patch weights to the direction vectors of the patches:

$$R(v,U) = Uv = [u^{(1)}, u^{(2)}, \ldots, u^{(m)}] \cdot (v_1, v_2, \ldots, v_M)$$

With the above partition and rectification functions, the rectification weights v can be optimized over patches instead of all input dimensions. This effectively reduces the dimensionality of the exploration space from N ×H×W×C to M.

For the estimation of rectification weights for patches, it is proposed to use the NES estimator which has been shown to be more efficient than FD in black-box image attacks (Ilyas et al., see supra). The efficiency of FD will be compared with NES below in details. Instead of maximizing the adversarial objective directly, NES maximizes the expected value of the objective under a search distribution. Different from Ilyas where the gradient of adversarial loss with respect to the input is estimated, in this application it is to estimate the gradient with respect to the patch weights v.

For an adversarial loss function $l_{adv}(\bullet)$, input x, tentative patches U, current parameters v and a search distribution $\pi(\gamma|v)$, we have:

$$\nabla_v \mathbb{E}_{\pi(\gamma|v)} [\ell_{adv}(x + R(\gamma, U))] = \mathbb{E}_{\pi(\gamma|v)} [\ell_{adv}(x + R(\gamma, U)) \nabla_v \log(\pi(\gamma | v))].$$

In this application, it is to use the normal distribution as the search distribution, that is, $\gamma = v + \sigma\delta$ where $\sigma$ is the search variance and $\delta \sim N(0, I)$ (standard normal distribution). It is to use antithetic sampling to generate a population of $\lambda$, number of $\delta_k$ values: first sample Gaussian noise for $$k \in \left\{1, \ldots, \frac{\lambda}{2}\right\},$$

then set $\delta_k = \delta_{\lambda-k+1}$ for $$k \in \left\{\left(\frac{\lambda}{2} + 1\right), \ldots, \lambda\right\}.$$

Evaluating the gradient with a population of $\lambda$ points sampled under this scheme yields the following gradient estimate:

$$\nabla_v \mathbb{E} [\ell_{adv}(x + R(\gamma, U))] \approx \frac{1}{\lambda \sigma} \sum_{k=1}^{\lambda} \delta_k \ell_{adv}(x + R(v + \sigma\delta_k, U)).$$

Within each perturbation step, v is initialized to zero values (see Eq. (1)) such that the starting point x+R(v, U) is centered at x.

The complete estimation algorithm for patch rectification is described in Algorithm 2 (see infra), where the function TransformedAdvLoss (•) is a ranking-based nonlinear transformation on the adversarial loss. The transformed loss increases monotonically with the original adversarial loss ("Natural evolution strategies", Wierstra et al., Journal of Machine Learning Research, 2014). For targeted attacks, it also "punishes" $\delta_k$ that fails to maintain the target class as the top-1 class by the highest loss value. With this estimated gradient for v, it is possible to update the rectification weights as $\hat{v} = v + \nabla_v \mathbb{E} [l_{adv}(x + R(\gamma, U))]$. It is then to use $\hat{v}$ to rectify tentative perturbations U to $R(\hat{v}, U)$, which allows to apply one step of PGD perturbation following Eq. (6).

---

Algorithm 2 NES Estimation of Patch Rectification

---

Input: Adversarial loss $l_{adv}(X)$ with respect to input x and tentative perturbation patches U
Output: Estimate of $\nabla_v l_{adv}(x + R(v, U))$
Parameters: Search variance $\sigma$, sampling size $\lambda$
$\hat{v} \leftarrow 0_M$
for k = 1 to $\lambda/2$ do
    $\delta_k \leftarrow N(0_M, I_{M \times M})$
    $\hat{v} \leftarrow \hat{v} + \delta_k \cdot \text{TransformedAdvLoss}(l_{adv}(x + R(v + \sigma\delta_k, U)))$
    $\hat{v} \leftarrow \hat{v} - \delta_k \cdot \text{TransformedAdvLoss}(l_{adv}(x - R(v + \sigma\delta_k, U)))$
end for
$\hat{v} \leftarrow 1/_{+80+94}\hat{v}$
return $\hat{v}$

---

It is to prove that partition-rectified perturbation is an estimation of the projection of the adversarial gradient on a selected subspace. Let S be the input space with respect to X, direction vectors (e.g. u) of the tentative patches define a vector subspace $s_u \subseteq S$.

Using the chain rule, it is possible to show that the gradients with respect to the patch-wise rectification weights v are the directional derivatives of the patch directions u evaluated at v=0:

$$\frac{\partial \ell_{adv}(x + R(v, U))}{\partial v_m} = (u^{(m)})^T \nabla_x \ell_{adv}(x) = \frac{\partial \ell_{adv}(x)}{\partial u^{(m)}}.$$

Suppose there is a perfect estimation of directional derivative v, then the rectified perturbations become:

$$\hat{g} = R(\hat{v}, U) = \sum_{m=1}^{M} u^{(m)} \cdot \left(\frac{\partial \ell_{adv}(x)}{\partial u^{(m)}}\right).$$

Since $$\frac{\partial \ell_{adv}(x)}{\partial u^{(m)}}$$

is the directional derivative of $u^{(m)}$, $$u^{(m)} \cdot \left(\frac{\partial \ell_{adv}(x)}{\partial u^{(m)}}\right)$$

is the projection of adversarial gradient on the direction $u^{(m)}$, if the model is differentiable. Thus, rectified perturbations $\hat{g}$ is the vector sum of the gradient projection on each patch direction $u^{(m)}$. Rectified perturbation $\hat{g}$ can be regarded as the projection of adversarial gradient g on subspace $s_u$, as the projection of a vector on a subspace is the vector sum of the vector's projections on the orthogonal basis vectors of the subspace.

Figure 2:
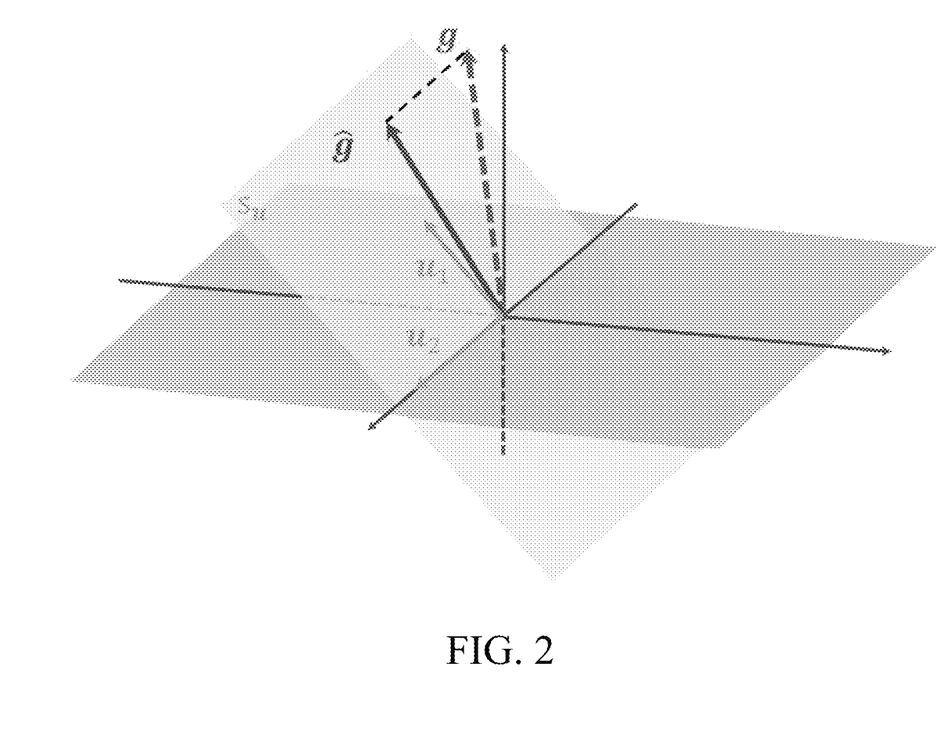
FIG. 2 is a graph illustrating a toy example of the projection of the gradient on subspace according to one embodiment of this invention.

FIG. 2 illustrates a toy example of the projection of the gradient on subsapce, where g is the adversarial gradient, $\hat{g}$ is the projection of g on a subspace $s_u$ that is defined by the direction vectors of two patches: $u^{(1)}$, $u^{(2)}$.

A beneficial property of the projection is that it is the closest vector to the gradient in subspace having $\hat{g} = \arg\min_\eta (\|g - \eta\|_2)$, $\forall_\eta \in s_u \subseteq S$. This enables to only consider the subspace $s_u$ to find a good approximate of the adversarial gradient g.

In an extreme case where each input dimension (or pixel) is a patch, the rectified perturbation becomes an exact estimate of the original pixel-wise adversarial gradient. However, this will require more queries to the target model, thus suffers from low efficiency. While in a typical case, patch-wise rectification is equivalent to estimating the projection of the adversarial gradient on a subspace $s_u$ and only requires a reasonable number of queries. On the other hand, better transferability of the tentative perturbations makes the subspace $s_u$ closer to the true adversarial gradient, and therefore leads to better approximations.

Experiments

Here it is provided a comprehensive evaluation of the V-BAD framework according to our invention and its variants, for both untargeted and targeted video attacks on three benchmark video datasets, against two state-of-the-art video recognition models. It is also to investigate different choices of tentative perturbation, partitioning method and estimation method in an ablation study.

Three benchmark datasets for video recognition are considered:

(1) UCF-101 ("Ucf101: A dataset of 101 human actions classes from videos in the wild", Soomro et al., arXiv preprint arXiv:1212.0402, 2012), which is an action recognition data set of 13320 realistic action videos, collected from YouTube, and consists of 101 action categories ranging from human-object/human-human interaction, body-motion, playing musical instruments to sports;

(2) HMDB-51 ("Hmdb: a large video database for human motion recognition", Kuehne et al., ICCV, 2011), which is a dataset for human motion recognition, which contains 6849 clips from 51 action categories including facial actions and body movements, with each category containing a minimum of 101 clips; and (3) Kinetics-400 ("The kinetics human action video dataset", Kaye et al., arXiv preprint arXiv:1705.06950, 2017), also a dataset for human action recognition, which consists of approximately 240000 video clips from 400 human action classes with about 400 video clips (10 seconds) for each class.

For each dataset, we randomly select one test video, from each category, that is correctly classified by the target model. For targeted attack, we randomly choose the target class for each video.

For all datasets, we set the perturbation bound to $\varepsilon_{adv} = 0.05$ per frame. The query limit, i.e., the maximum number of queries to the target model is set to $Q=3\times10^5$, which is similar to the number of queries required for most black-box image attacks to succeed. It is to run the attack until an adversarial example is found (attack succeeds) or the query limit is reached. Different attacking strategies are evaluated in terms of 1) success rate (SR), the ratio of successful generation of adversarial examples under the perturbation bound within the limited number of queries; and 2) average number of queries (ANQ), required for a successful attack (excluding failed attacks).

Two state-of-the-art video recognition models I3D and CNN+LSTM are considered here, as our target models to attack:

(1) I3D model "Quo vadis, action recognition? a new model and the kinetics dataset" (Carreira et al., CVPR, 2017), which proposes the Inflated 3D ConvNet (I3D) with Inflated 2D filters and pooling kernels of traditional 2D CNNs.

(2) CNN+LSTM based models ("Exploiting feature and class relationships in video categorization with regularized deep neural networks", Jiang et al., IEEE Transactions on Pattern Analysis and Machine Intelligence, vol. 40, no. 2, pp. 352-364, 2018; and "Beyond short snippets: Deep networks for video classification", Ng et al., CVPR, 2015), which exploited the temporal information contained in successive frames, with recurrent layers capturing long term dependencies on top of CNNs.

I3D is an inflated 3D convolutional network. A Kinetics-400 pretrained I3D is used and fine-tuned on other two datasets. Frames are sampled at 25 frames per second. CNN+LSTM is a combination of the conventional 2D convolutional network and the LSTM network. For CNN+LSTM a ImageNet pretrained ResNet101 is used as frame feature extractor, then an LSTM on top of it is fine-tuned. Input video frames are subsampled by keeping one out of every 5 for CNN+LSTM Model. Note only the RGB part for both video models is considered.

At test time, it is to use 32-frame snippets for UCF-101 and HMDB-51, and 64-frame snippets for Kinetics-400, as it has longer videos. The test accuracy of the two models can be found in Table 1. The accuracy gap between the one according to this invention and the one reported in Carreira is mainly caused by the availability of fewer input frames at test time.

TABLE 1

Test Accuracy (%) of the video models

| Model | UCF-101 | HMDB-51 | Kinetics-400 |
|---|---|---|---|
| I3D | 91.30 | 63.73 | 62.30 |
| CNN + LSTM | 76.29 | 44.38 | 53.20 |

ImageNet (see supra) pretrained deep networks is used as our image model for the generation of the tentative perturbation. ImageNet is an image dataset that contains more than 10 million natural images from more than 1000 classes.

Given the difference between our video datasets and ImageNet, rather than using one model, it is to chose an ensemble of ImageNet models as our image model: ResNet50 ("Deep residual learning for image recognition", He et al., CVPR, 2016), DenseNet121 and DenseNet169 ("Densely connected convolutional networks", Huang et al., CVPR, 2017).

For tentative perturbation, the perturbation extracted from the three image models is averaged to obtain the final perturbation.

For partitioning, uniform partitioning is used to get 8×8 patches per frame and the NES population size of each estimation is set as 48, which works consistently well across different datasets in terms of both success rate and number of queries.

For search variance a in NES, it is set to $10^{-6}$ for the targeted attack setting and $10^{-3}$ for the untargeted attack setting. This is because a targeted attack needs to keep the target class in the top-1 class list to get the score of the targeted class, while the aim of an untargeted attack is to remove the current class from top-1 class position, which enables a large search step.

Here, variants of V-BAD are evaluated, with different types of 1) tentative perturbation, 2) partitioning methods and 3) estimation methods. Experiments were conducted on a subset of 20 randomly selected categories from UCF-101 dataset.

Table 2 shows the results for V-BAD with different: 1) tentative perturbation, 2) partitioning methods, and 3) estimation methods, wherein symbol "+" indicates fixed methods for untested components of V-BAD, and best results are highlighted in bold. The results in terms of success rate (SR) and average number of queries (ANQ) can be found in Table 2.

TABLE 2

| Components of V-BAD | Method | UCF-101 ANQ | SR (%) |
|---|---|---|---|
| Tentative Perturbations | Static | 51786 | 70 |
| + partition: Uniform | Random | 107499 | 95 |
| + estimation: NES | Single | 57361 | 100 |
|  | Ensemble | 49797 | 100 |
| Partitioning Method | Random | 77881 | 100 |
| + tentative: Ensemble | Uniform | 49797 | 100 |
| + estimation: NES |  |  |  |
| Estimation Method | FD | 61585 | 70 |
| + tentative: Ensemble | NES | 49797 | 100 |
| + partition: Uniform |  |  |  |

V-BAD is firstly evaluated with the three different types of tentative perturbation discussed above: 1) Random, 2) Static, and 3) Transferred.

For transferred, two different strategies are test, with either a single image model ResNet-50 (denoted as "Single") or an ensemble of the three considered image models (denoted as "Ensemble"). The partitioning and estimation methods were set to Uniform and NES respectively (see results in Table 2).

A clear improvement can be observed for the use of transferred tentative perturbation compared to static or random perturbation. The number of queries required for successful attacks was dramatically reduced from more than $10^5$ to less than $6 \times 10^4$ by using only a single image model. This confirms that an image model alone can provide effective guidance for attacking video models. The number was further reduced to around $5 \times 10^4$ via the use of an ensemble of three image models.

Compared to random perturbation, static perturbation requires fewer queries to succeed, with 50% less queries due to the small exploration space. However, static perturbation has a much lower success rate (70%) than random perturbation (95%). This indicates that fixed directions can generate adversarial examples faster with restricted exploration space, but at the same time, such restrictions may render the algorithm to be stuck in some local minima, without exploring other directions that could lead to more potentially more powerful attacks.

In this experiment, the two types of partitioning methods introduced above are investigated, namely, Random and Uniform. For tentative perturbation, the best method found in the previous experiments—Ensemble, are used (see results in Table 2). As can be seen, both partitioning methods can find successful attacks, but the use of uniform partitioning significantly reduces the number of queries by 36%, to around $5 \times 10^4$ from $8 \times 10^4$ of random partitioning. This is because a tentative perturbation generated from image models often shares certain local patterns, but random partitioning tends to destroy such locality. Recall that partitioning is applied in every step of perturbation, and as such, uniform partitioning can help to maintain stable and consistent patches across different perturbation steps. This allows the rectification to make continuous corrections to the same local patches.

As mentioned above, any derivative-free (or black-box) optimization methods can be used to estimate the rectification factors. Here, two of the methods that have been used for black-box image attacks: FD (Finite Difference) and NES (Natural Evolution Strategies) are compared. For a fair comparison, some adjustments are made to the number of patches used by the FD estimator, so that FD and NES both require a similar number of queries per update (see results in Table 2). NES demonstrates a clear advantage over FD: FD only achieves 70% success rate within the query limit (e.g. $3 \times 10^5$), while NES has a 100% success rate with a lower average number of queries. And the number of queries required by successful NES attacks is roughly 20% less than that of FD attacks.

Based on the ablation results, in the following experiments, the V-BAD framework is set to ensemble tentative directions, uniform partitioning, and NES rectification estimator.

In the experiments, the V-BAD framework of this invention is compared with two existing prior art black-box image attack methods. Instead of directly applying the two existing image attack methods to videos, their logic is incorporated into the V-BAD framework of this invention to generate two variants of V-BAD.

The first baseline method is the pixel-wise adversarial gradient estimation using NES, proposed by Ilyas (see supra). This can be easily achieved by setting the patches in V-BAD to pixels, i.e., each pixel is a patch. This baseline variant of V-BAD is denoted by P-BAD. The NES population size for P-BAD is set as 96, since there are many more parameters to estimate.

The second baseline method is grouping-based adversarial gradient estimation using FD, proposed by Bhagoji (see supra). This method explores random partitioning to reduce the large number of queries required by FD, and does not use tentative directions. Accordingly, this variant of V-BAD that utilizes static tentative directions and random partitioning, and is denoted by SR-BAD. Different from its original setting with FD, here NES is used for SR-BAD which was found more efficient in our experiments.

Table 3 shows comparison results for targeted attacks on UCF-101/HMDB-51/Kinetics-400 against I3D/CNN+LSTM models, wherein best results are in bold.

TABLE 3

| Target Model | Attack | UCF-101 | | HMDB-51 | | Kinetics-400 | |
|---|---|---|---|---|---|---|---|
| | | ANQ | SR (%) | ANQ | SR (%) | ANQ | SR (%) |
| I3D | SR-BAD | 67909 | 96.0 | 40824 | 96.1 | 76986 | 96.0 |
| | P-BAD | 104986 | 96.0 | 62744 | 96.8 | 98402 | 96.0 |
| | V-BAD | 60687 | 98.0 | 34260 | 96.8 | 66379 | 98.0 |
| CNN + LSTM | SR-BAD | 147322 | 45.5 | 67037 | 82.4 | 109314 | 73.0 |
| | P-BAD | 159723 | 60.4 | 72697 | 90.2 | 117368 | 85.0 |
| | V-BAD | 84294 | 93.1 | 44944 | 98.0 | 70897 | 97.0 |

Among the three methods, V-BAD achieved the best success rates, consistently using least number of queries across the three datasets and two recognition models. Specifically, V-BAD only takes $(3.4\sim8.4)\times10^4$ queries to achieve a success rate of above 93%. Note that this is comparable to prior art black-box image attacks (Ilyas). Comparing P-BAD and V-BAD, pixel-wise estimation by P-BAD does not seem to yield more effective attacks, whereas on the contrary, uniform partitioning by V-BAD not only reduces ~50% queries, but also leads to more successful attacks.

To compare the performance on different target models, an obvious degradation of performance can be observed on CNN+LSTM model. This is because CNN+SLTM has a lower accuracy than I3D, making it relatively robust to targeted attacks (not for untargeted attacks), an observation that is consistent with findings in "Robustness may be at odds with accuracy" (Tsipras et al., ICLR, 2019). However, this impact is much smaller on V-BAD where the accuracy decreases less than 5%, while the accuracy of P-BAD and SR-BAD has a huge drop, especially on UCF-101(from 96.0% to 45.5%).

Figure 3:
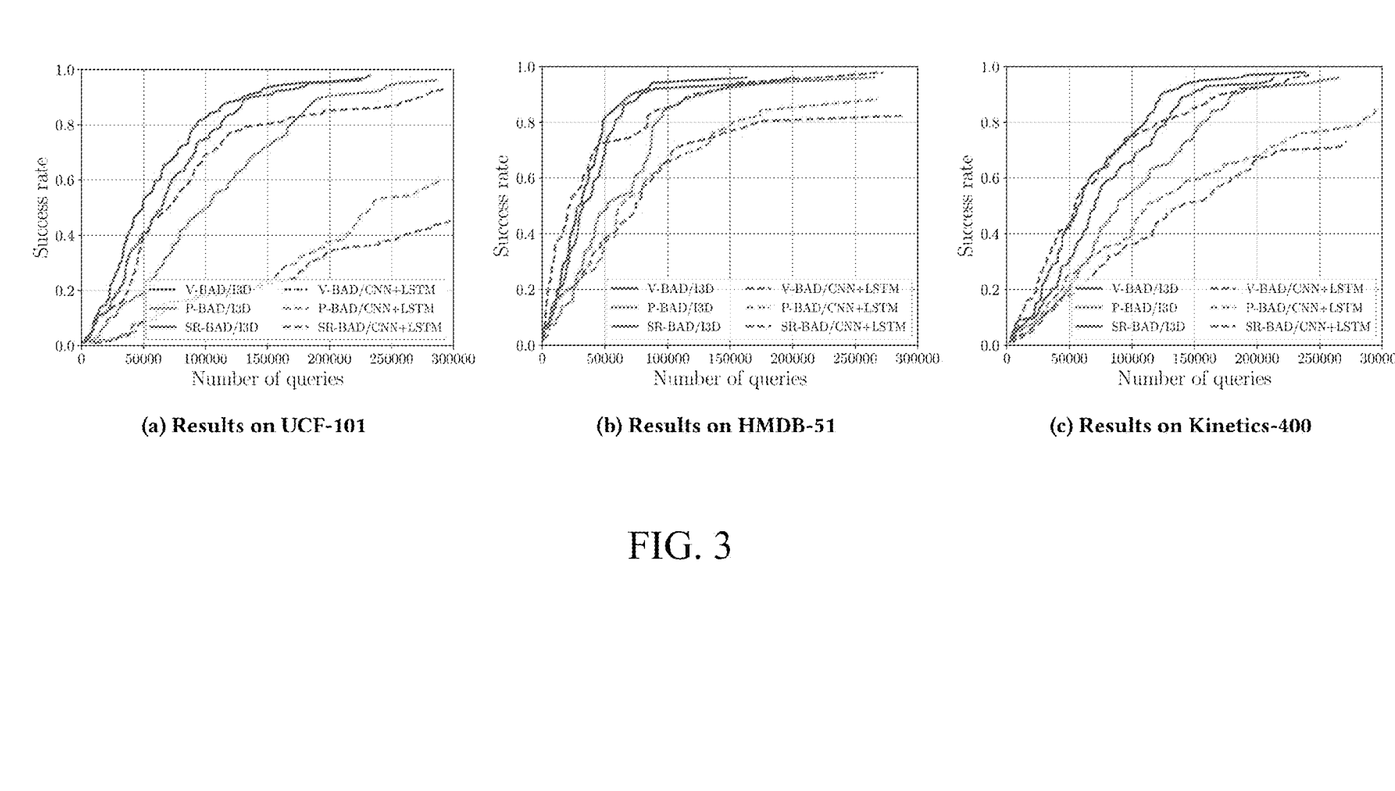
FIG. 3 shows graphs of the changes in success rate with the number of queries according to embodiments of the invention.

This is further illustrated in FIG. 3, showing change in success rate with the number of queries. This can probably be explained by the better transferability of transferred tentative perturbation on CNN+LSTM than I3D due to the similar 2D CNN used in CNN+LSTM video model. As in FIG. 3, the advantage of better transferability even overcomes the low accuracy drawback of CNN+LSTM on HMDB-51 dataset: V-BAD/CNN+LSTM is above V-BAD/I3D for the first $4\times10^4$ queries.

Figure 4:
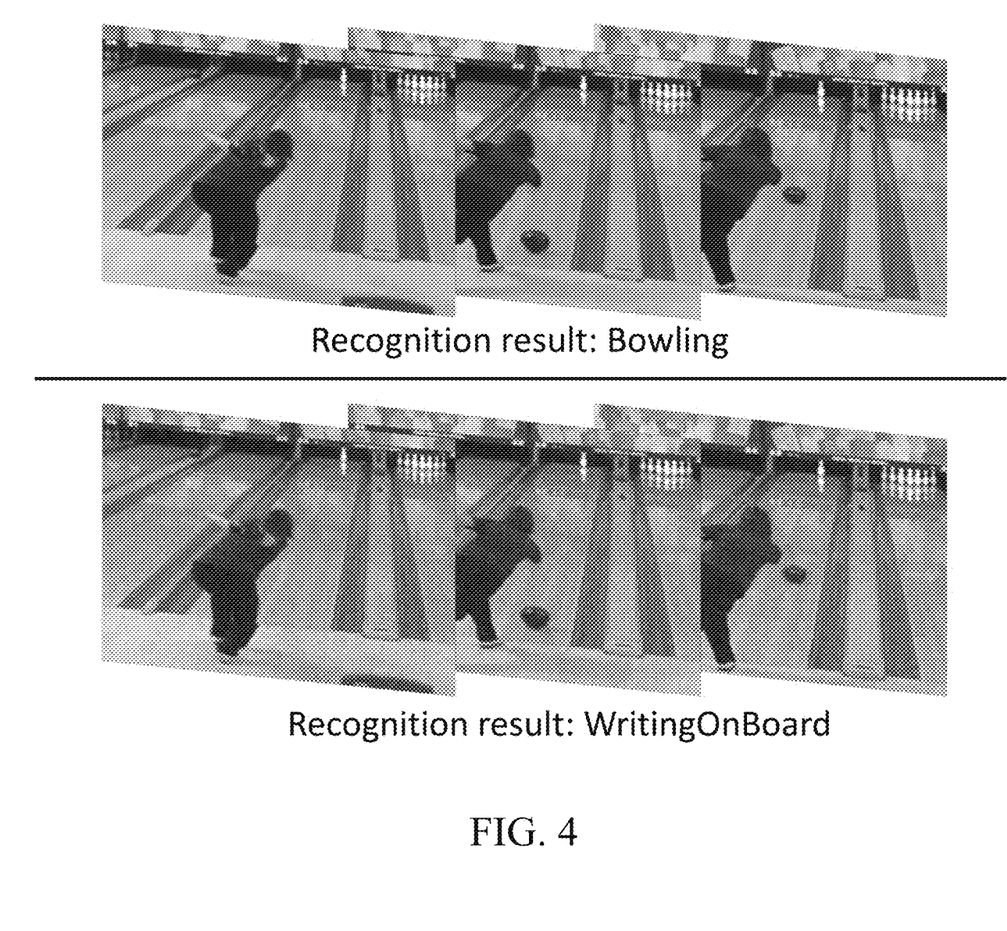
FIG. 4 shows original and modified video content illustrating a targeted video adversarial example generated by V-BAD according to an exemplary embodiment.

A targeted video adversarial examples generated by V-BAD is illustrated in FIG. 4, where video on the top is the original video with the correct class and video at the bottom is the video adversarial misclassified as the adversarial class.

Results for untargeted attacks on UCF-101/HMDB-51/Kinetics-400 against I3D/CNN+LSTM models are reported in Table 4, wherein best results are in bold. Compared to targeted attacks, untargeted attacks are much easier to achieve, requiring only ~10% queries of targeted attacks. Compared to other baselines, V-BAD is the most effective and efficient attack across all datasets and recognition models. It only takes a few hundred queries for V-BAD to completely break the CNN+LSTM models. Both attacks indicate that video models are as vulnerable as image models to black-box adversarial attacks. This has serious implications for the video recognition community to consider.

TABLE 4

| Target Model | Attack | UCF-101 | | HMDB-51 | | Kinetics-400 | |
|---|---|---|---|---|---|---|---|
| | | ANQ | SR (%) | ANQ | SR (%) | ANQ | SR (%) |
| I3D | SR-BAD | 5143 | 98.0 | 1863 | 100.0 | 1496 | 100.0 |
| | P-BAD | 11571 | 98.0 | 4162 | 100.0 | 3167 | 100.0 |
| | V-BAD | 3642 | 100.0 | 1152 | 100.0 | 1012 | 100.0 |
| CNN + LSTM | SR-BAD | 8674 | 100.0 | 684 | 100.0 | 1181 | 100.0 |
| | P-BAD | 12628 | 100.0 | 1013 | 100.0 | 1480 | 100.0 |
| | V-BAD | 784 | 100.0 | 197 | 100.0 | 293 | 100.0 |

It is further to explore the quality of various tentative gradients (perturbations) and rectified gradients generated by different variants of V-BAD. The gradient quality is measured by calculating the cosine similarity between the ground-truth adversarial gradient and the tentative/rectified gradients. The results are based on 20 random runs of the attacks on 50 videos randomly chosen from UCF-101. Table 5 shows the results, which have cosine similarity between varies tentative or rectified gradients and the actual gradient. Consistent with the comparison experiments, V-BAD generates the best gradient estimates and P-BAD has the worst estimation quality. All the rectified gradients are much better than the tentative gradients. This verifies that tentative perturbations can be significantly improved by proper rectification.

TABLE 5

| Tentative | Static | Random | Transferred |
|---|---|---|---|
| Cosine | $7.177 \times 10^{-5}$ | $-1.821 \times 10^{-5}$ | $-2.743 \times 10^{-4}$ |
| Rectified | SR-BAD | P-BAD | V-BAD |
| Cosine | $3.480 \times 10^{-3}$ | $3.029 \times 10^{-3}$ | $4.661 \times 10^{-3}$ |

One interesting observation is that the transferred tentative perturbation (from an ensemble of ImageNet models) has a large negative cosine similarity, which is opposite to our design. One explanation could be that there is a huge gap between the image model and the video model. However, note that while the transferred perturbation is opposite to the gradient, it serves as a good initialization and yields better gradient estimation after rectification. It is noteworthy that there is still a considerable gap between the gradient estimate and the actual gradient. From one aspect, it reflects that very accurate gradient estimation are not necessary to generate adversarial examples. From another aspect, it suggests that black-box attack based on gradient estimation has great scope for further improvement.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:
1. A method for providing black-box video attacks on video recognition models, comprising:
   a) passing input video frames into a public image model, to obtain pixel-wise tentative perturbations;
   b) partitioning the tentative perturbations into tentative perturbation patches;

c) estimating the rectification weight required for each patch, via querying the target video model;

d) applying the patch-wise rectification weight on the patches, to obtain the rectified pixel-wise perturbations;

e) applying one step projected gradient descent (PGD) perturbation on the input video, according to the rectified pixel-wise perturbations; and f) iteratively performing steps a)-e) until an attack succeeds or a query limit is reached.

2. The method of claim 1, wherein the tentative perturbation is defined as the sign values of the perturbation.

3. The method of claim 1, wherein the tentative perturbation is a random perturbation, wherein the perturbation for each input dimension is generated randomly with 50% probability of being either 1 or −1.

4. The method of claim 1, wherein the tentative perturbation is a static perturbation, wherein the perturbation for each input dimension is fixed to 1.

5. The method of claim 1, wherein the tentative perturbation is a transferred perturbation, wherein the perturbation can alternatively be transferred from existing pre-trained image models.

6. The method of claim 1, wherein each tentative perturbation patch is adjusted by multiplying all its dimensions by a rectification factor found by a gradient estimator.

7. The method of claim 6, wherein the gradient estimator is FD or NES.

8. The method of claim 1, wherein the partitioning step includes dividing input dimensions randomly into a certain number of partitions.

9. The method of claim 1, wherein the partitioning step includes splitting a frame uniformly into some patches.

10. The method of claim 1, wherein the partitioning step includes partitioning the video input according to its semantic content.

11. The method of claim 1, wherein a successful attack comprises the situation that an untargeted adversarial example has been found or a targeted adversarial example.

12. The method of claim 1, wherein the query limit is preset.

13. The method of claim 11, wherein the untargeted adversarial example is an example that can be misclassified in an arbitrary class other than the correct one.

14. The method of claim 11, wherein the targeted adversarial example is an example that can be misclassified in a targeted adversarial class.

15. The method of claim 1, wherein the public image model is pre-trained ImageNet.

16. A system for providing black-box video attacks on a video recognition model, comprising:

a) a perturbation creator for creating pixel-wise tentative perturbations by passing input video frames into a public image model;

b) a partitioner for dividing the tentative perturbations into tentative perturbation patches;

c) a black-box gradient estimator for estimating the rectification weight required for each patch, via querying the target video model;

d) a patch-based rectifier for applying the patch-wise rectification weight on the patches, to obtain the rectified pixel-wise perturbations;

e) a frame modifier for applying one step projected gradient descent (PGD) perturbation on the input video, according to the rectified pixel-wise perturbations;

f) a counter for counting query numbers; and g) a receiver for receiving the recognition result from the video recognition model;

wherein the perturbation creator, the partitioner, the black-box gradient estimator, the patch-based rectifier and the frame modifier work iteratively, until the query numbers reach a query limit in the counter, or a result including an untargeted adversarial example or a target adversarial example is received by the receiver.

17. The system of claim 16, wherein the partitioner divides the tentative perturbations into tentative perturbation patches randomly.

18. The system of claim 16, wherein the partitioner divides the tentative perturbations into tentative perturbation patches uniformly.

19. The system of claim 16, wherein the partitioner divides the tentative perturbations into tentative perturbation patches according to the semantic content of the tentative perturbations.

* * * * *